United States Patent [19]

Tseng

[11] Patent Number: 5,299,180
[45] Date of Patent: Mar. 29, 1994

[54] SOUND REPEATER UNIT ADAPTED FOR USE WITH AN AUDIO INPUT AND AUDIO OUTPUT EQUIPMENT

[76] Inventor: Pei-Jen Tseng, 4F, No. 17, Alley 4, Land 137, Sec. 5, Min-Sheng E. Rd., Taipei City, Taiwan

[21] Appl. No.: 925,253

[22] Filed: Aug. 6, 1992

[51] Int. Cl.⁵ .................. H04M 15/00; H04B 1/20
[52] U.S. Cl. ............................. 369/1; 369/4; 360/5; 360/19.1; 360/10.1
[58] Field of Search .............. 369/1, 2, 3, 4, 5; 360/10.1, 5, 19.1, 35.1

[56] References Cited

U.S. PATENT DOCUMENTS 4,531,161  7/1985  Murakoshi .................. 360/5

FOREIGN PATENT DOCUMENTS 61-134966  6/1986  Japan .......................... 369/4

*Primary Examiner*—Robert J. Pascal
*Assistant Examiner*—Tan Dinh

[57] ABSTRACT

A sound repeater unit is to be used with an audio input equipment, such as a cassette or video tape recorder, and an audio output equipment, such as a television set or a loudspeaker. The audio input equipment has a control unit which is actuated so as to operate the audio input equipment in a paused state. The sound repeater unit includes a pause control circuit receiving an activating signal from the control unit and a programmable signal repeating circuit controlled by the pause control circuit so as to record continuously an audio frequency output of the audio input equipment while overwriting a previously recorded audio frequency output of the latter. The pause control circuit further controls the signal repeating circuit so as to output repeatedly a portion of the audio frequency output, which portion was recorded within a predetermined time period immediately before the audio input equipment was paused. The pause control circuit further controls a switch so as to send the audio frequency output directly to the audio output equipment when the audio input equipment is in the normal operating state and so as to send the output of the signal repeating circuit to the audio output equipment when the audio input equipment is paused. The audio output equipment has a repeating sound output when the audio input equipment is in the paused state.

9 Claims, 8 Drawing Sheets

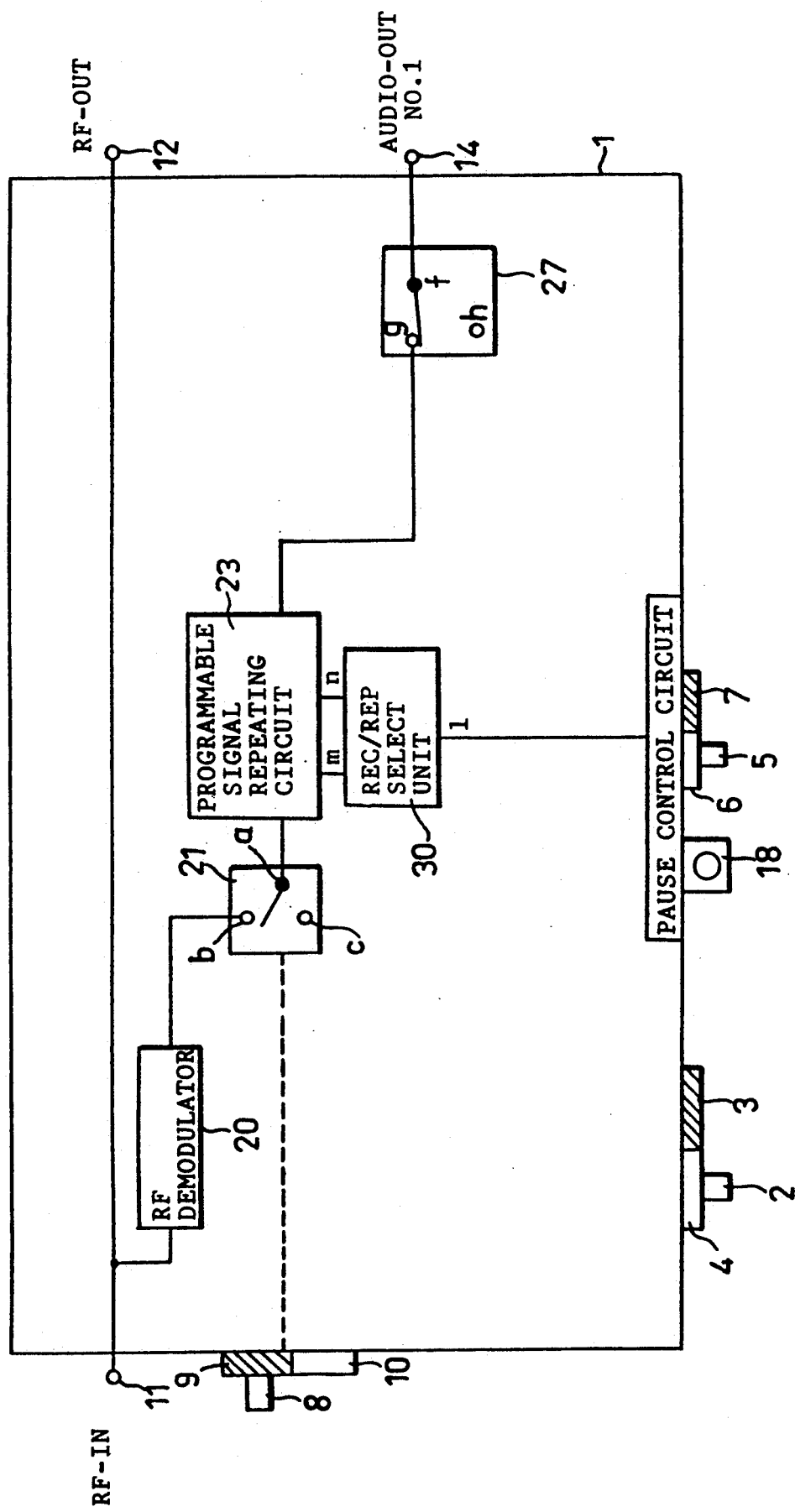
F I G. 3

SENSOR OUTPUT (Q) OUTPUT OF
FIRST
MULTIVIBRATOR ($\overline{Q}$) OUTPUT OF FIRST
MULTIVIBRATOR ($\overline{Q}$) OUTPUT OF
SECOND
MULTIVIBRATOR ($\overline{DOUT}$) PIN OF
MEMORY UNIT (Q) OUTPUT OF
THIRD
MULTIVIBRATOR

OUTPUT OF XOR GATE

SOUND REPEATER UNIT ADAPTED FOR USE WITH AN AUDIO INPUT AND AUDIO OUTPUT EQUIPMENT

BACKGROUND OF THE INVENTION

1. Field of the Invention

The invention relates to a sound repeater unit, more particularly to a sound repeater unit which is adapted for use with an audio input equipment, such as a cassette tape recorder, a video tape recorder or a laser karaoke machine, and an audio output equipment, such as a television set or a loudspeaker.

2. Description of the Related Art

Conventional speech training devices are usually provided with an audio signal storage and playback circuit to process audio signals. Such speech training devices are not adapted for use with an existing audio input equipment, such as cassette tape recorders, video tape recorders, laser karaoke machines and the like, and cannot be used to record and reproduce a selected audio signal from the audio input equipment. A cassette tape recorder is usually connected to the audio input equipment in order to record and reproduce a selected audio signal from the audio input equipment. The conventional cassette tape recorder, however, cannot be conveniently operated when it is desired to play repeatedly one part of a previously recorded audio signal. Furthermore, repeated forward or rewinding action of the cassette tape recorder can reduce the useful life of the same and can cause damage to the cassette tape in use.

SUMMARY OF THE INVENTION

Therefore, the main objective of the present invention is to provide a sound repeater unit which is adapted for use with an audio input equipment, such as a cassette tape recorder, a video tape recorder, a laser karaoke machine and the like, and which does not employ a cassette tape recorder to record and reproduce a selected audio signal from the audio input equipment.

Accordingly, the preferred embodiment of a sound repeater unit of the present invention is to be used with an audio input equipment, such as a cassette tape recorder or a video tape recorder, and an audio output equipment, such as a television set or a loudspeaker. The audio input equipment has a control unit with a pause key which is actuated so as to operate the audio input equipment in a paused state. The sound repeater unit includes a pause control circuit, which receives an activating signal from the control unit, and a programmable signal repeating circuit which is controlled by the pause control circuit so as to record continuously an audio frequency output of the audio input equipment while overwriting a previously recorded audio frequency output of the latter. The pause control circuit further controls the signal repeating circuit so as to output repeatedly a portion of the audio frequency output, which portion was recorded within a predetermined time period immediately before the pause key was actuated in order to operate the audio input equipment in the paused state. The pause control circuit further controls a switch so as to send the audio frequency output directly to the audio output equipment when the audio input equipment is in the normal operating state and so as to send the output of the signal repeating circuit to the audio output equipment when the pause key is actuated so as to operate the audio input equipment in the paused state. The audio output equipment has a repeating sound output when the audio input equipment is in the paused state.

BRIEF DESCRIPTION OF THE DRAWINGS

Other features and advantages of the present invention will become apparent in the following detailed description of the preferred embodiment, with reference to the accompanying drawings, of which:

FIG. 3 is an equivalent schematic circuit block diagram of the preferred embodiment when in a second preferred operating state;

DETAILED DESCRIPTION OF THE PREFERRED EMBODIMENT

Figure 1:
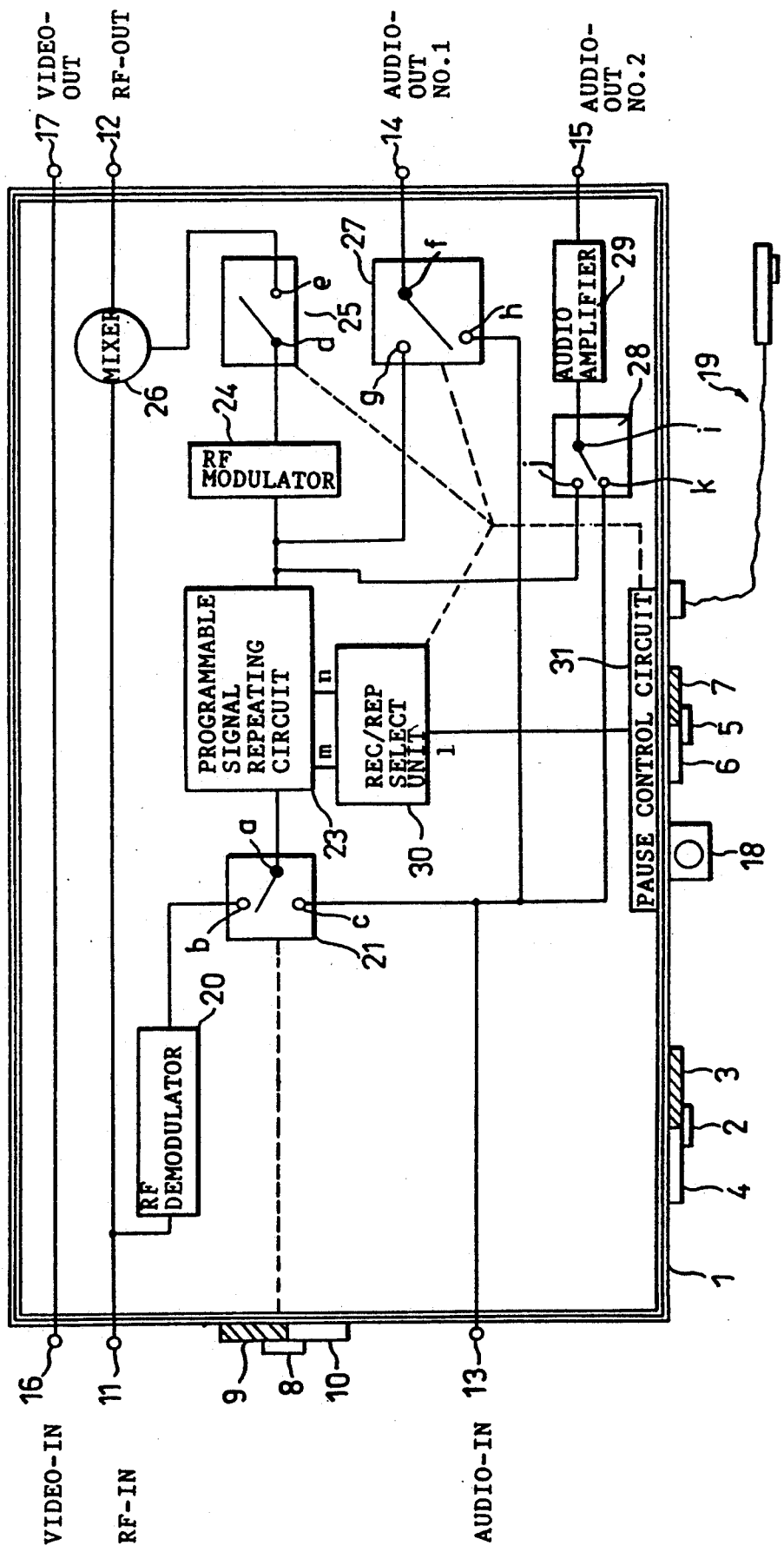
FIG. 1 is a schematic circuit block diagram of the preferred embodiment of a sound repeater unit according to the present invention.

Referring to FIG. 1, the preferred embodiment of a sound repeater unit according to the present invention is adapted to receive audio and radio frequency signals from an external audio input equipment, such as a video tape recorder, a laser karaoke machine and the like. The pause key of a remote control unit (not shown) of the audio input equipment or the pause key of a line control unit (19) is operated to control the generation of a repeated sound output. The sound repeater unit has a housing (1) and first, second and third slide buttons (2, 5, 8) which are mounted on the housing (1). The first slide button (2) is placed in a first position (3) when it is desired to operate the preferred embodiment in a normal operating mode and in a second position (4) when it is desired to operate the preferred embodiment in a learning mode. The second slide button (5) is placed in a third position (6) when the preferred embodiment is to be controlled by the remote control unit and in a fourth position (7) when the preferred embodiment is to be controlled by the line control unit (19). The third slide button (8) is placed in a fifth position (9) so as to configure the preferred embodiment to receive radio frequency signals and in a sixth position (10) so as to configure the preferred embodiment to receive audio frequency signals.

The sound repeater unit further has a radio frequency input (RF-IN) terminal (11), a radio frequency output (RF-OUT) terminal (12), an audio frequency input (AUDIO-IN) terminal (13), a first audio frequency output (AUDIO-OUT NO. 1) terminal (14), a second audio frequency output (AUDIO-OUT NO. 2) terminal (15), a video input (VIDEO-IN) terminal (16), a video output (VIDEO-OUT) terminal (17) and a sensor unit (18).

A radio frequency demodulator (20) is provided inside the housing (1) and converts the radio frequency signal from the RF-IN terminal (11) into an audio frequency signal. An RF/audio signal select switch (21) is controlled by the third slide button (8) so as to connect a first switch terminal (a) with a second switch terminal (b) when the third slide button is in the fifth position (9), and so as to connect the first switch terminal (a) with a third switch terminal (c) when the third slide button (8) is in the sixth position (10). A programmable signal repeating circuit (23) receives an audio frequency input from the demodulator (20) or from the AUDIO-IN terminal (13). The signal repeating circuit (23) basically comprises a programmable CMOS voice encoder/decoder integrated circuit (CIC 5500) and a signal memory unit (both not shown). The configuration of the signal repeating circuit (23) is known in the art and will not be detailed herein.

The signal repeating circuit (23) has been programmed so as to output repeatedly the audio frequency signal which was recorded therein. A radio frequency modulator (24) receives the audio frequency output of the signal repeating circuit (23) and modulates the same so as to obtain a radio frequency signal. A first relay switch (25) has a pair of switch terminals (d, e) and is in a normally open state. A mixer (26) has a first input which is connected to the RF-IN terminal (11) and a second input which is connected to the switch terminal (e) of the first relay switch (25). The output of the mixer (26) is connected to the RF-OUT terminal (12). A second relay switch (27) has three switch terminals (f, g, h). The switch terminals (f, h) are normally connected to one another, thereby permitting the audio frequency signal at the AUDIO-IN terminal (13) to be sent to the AUDIO-OUT NO. 1 terminal (14). A third relay switch (28) has three switch terminals (i, j, k). The switch terminals (i, k) are normally connected to one another. An audio amplifier (29) is connected to the switch terminal (i) of the third relay switch (28) and is responsible for amplifying audio frequency signals from the third relay switch (28). The output of the audio amplifier (29) is connected to the AUDIO-OUT NO. 2 terminal (15).

The signal repeating circuit (23) is connected to a recording/reproduction (REC/REP) select unit (30). The REC/REP select unit (30) has an input terminal (1) and two output terminals (m, n) connected to the signal repeating circuit (23). The select unit (30) normally generates a control signal at the output terminal (m), thereby enabling the signal repeating circuit (23) to record continuously approximately 20 seconds of the incoming audio frequency signal from the signal select switch (21) while overwriting the previously recorded REC/REP select unit (30) is connected to a pause control circuit (31). The pause control circuit (31) is disposed adjacent to the second slide button (5). The second slide button (5) is operated so as to determine if the pause control circuit (31) is to be activated by the line control unit (19) or by the remote control unit of the audio input equipment which is in use. Whenever the pause control circuit (31) is activated, the pause control circuit (31) controls the first, second and third relay switches (25, 27, 28) in order to connect respectively the switch terminals (d, e) of the first relay switch (25), the switch terminals (f, g) of the second relay switch (27), and the switch terminals (i, j) of the third relay switch (28). The pause control circuit (31) further controls the REC/REP select unit (30) so as to generate a control signal at the output terminal (n) of the REC/REP select unit (30), thereby enabling the signal repeating circuit (23) to output repeatedly the audio frequency signal which has been recorded therein.

The preferred embodiment can be used to interface a video tape recorder and a television set. When the first slide button (2) is in the first position (3), the preferred embodiment is in a normal operating mode and permits the transmission of audio and video signals from the video tape recorder to the television set without processing the same. The first slide button (2) opens a switch unit (not shown) to prevent the pause control circuit (31) from receiving the pause signal from the sensor unit (18) or from the line control unit (19). A control signal is normally present at the output terminal (m) of the REC/REP select unit (30), thereby placing the signal repeating circuit (23) in a recording mode. The signal repeating circuit (23) is prevented from repeatedly outputting an audio frequency signal at this stage. Note that the switch terminals (d, e) of the first relay switch (25) are opened and the switch terminals (f, h) of the second relay switch (27) and the switch terminals (i, k) of the third relay switch (28) are in respective electrical connection at this stage. The electrical signals entering the input terminals of the preferred embodiment are not processed by the signal repeating circuit (23) and are directed toward the corresponding output terminals. The signal repeating circuit (23) does not provide a repeated audio signal output even when the pause key of the remote control unit or the line control unit (19) is pressed, thereby enabling the entire system to operate as a conventional audio-visual system.

The preferred embodiment is in the learning mode when the first slide button (2) is placed in the second position (4). The switch unit (not shown) which connects the pause control circuit (31) and the sensor unit (18) and the line control unit (19) is closed, thereby permitting the pause control circuit (31) to receive the pause signal therefrom. The signal repeating circuit (23) can be operated in the recording mode or in the reproducing mode at this stage.

The following is a more detailed description of the operation of the preferred embodiment when in the learning mode:

A. If the preferred embodiment is to be used with a video tape recorder, the second slide button (5) is initially placed in the third position (6), thereby permitting remote control operation of the preferred embodiment.

Figure 2:
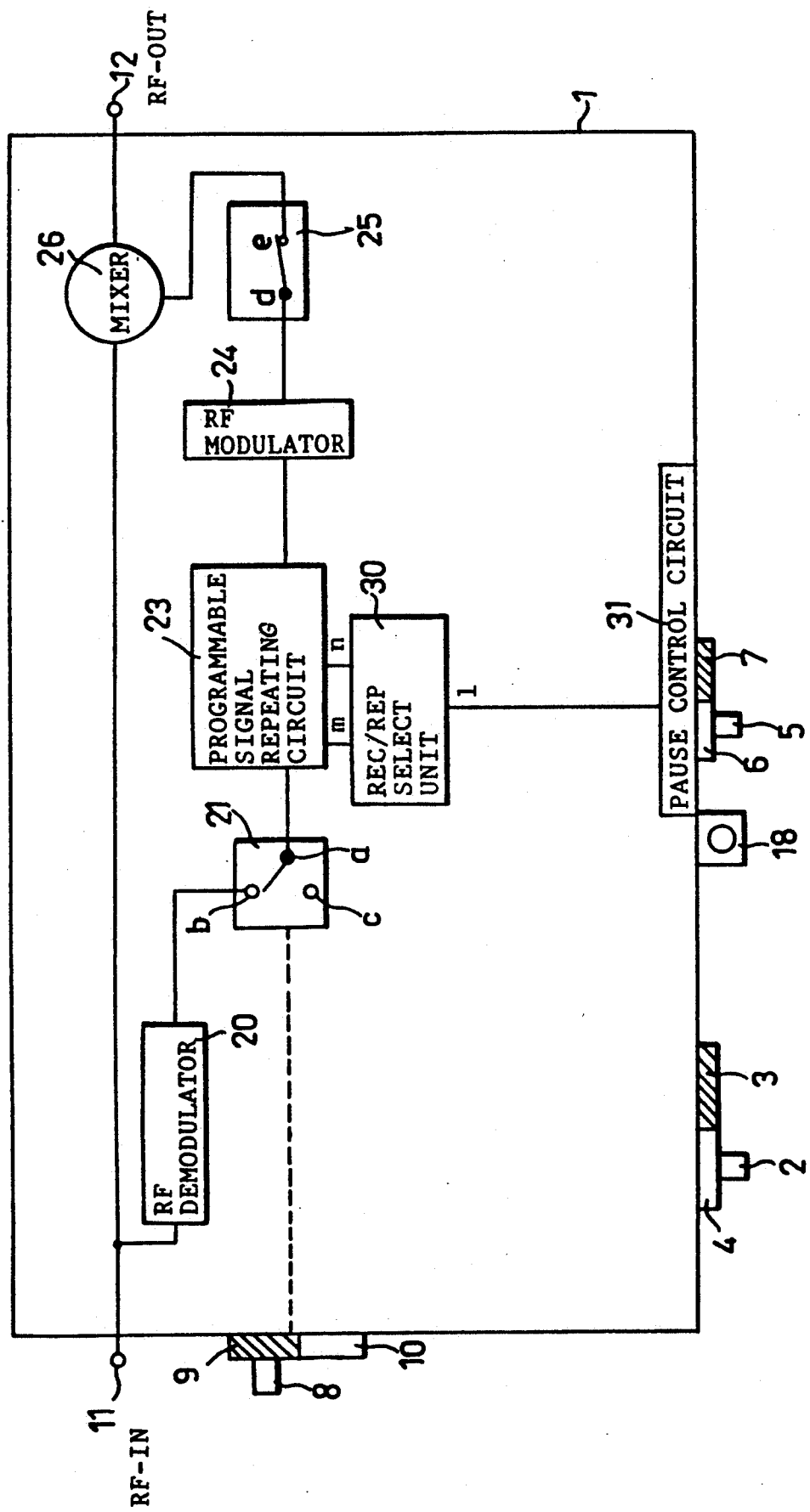
FIG. 2 is an equivalent schematic circuit block diagram of the preferred embodiment when in a first preferred operating state.

1. FIG. 2 is an equivalent schematic circuit block diagram of the preferred embodiment when used with a television set which has no audio/video input terminal. The RF-IN terminal (11) is connected to the RF-OUT terminal of the video tape recorder. The RF-OUT terminal (12) is connected to the RF-IN terminal, such as the antenna input, of the television set. The third slide button (8) is placed in the fifth position (9), thereby causing the connection of the switch terminals (a, b) of the signal select switch (21). The radio frequency signal from the video tape recorder, which is provided to the RF-IN terminal (11), has a first portion, which passes through the mixer (26) and which is sent to the RF-OUT terminal (12) for reception by the television set, and a second portion, which is received by the demodulator (20) for conversion into a corresponding audio frequency signal. The output of the demodulator (20) is received by the signal repeating circuit (23) via the switch terminals (a, b) of the signal select switch (21). The signal repeating circuit (23) normally receives a control signal at the output terminal (m) of the REC/-

REP select unit (30), thereby enabling the signal repeating circuit (23) to record approximately 20 seconds of the audio frequency signal from the signal select switch (21) while overwriting the previously recorded audio frequency signal. When the pause key of the remote control unit of the video tape recorder is pressed, the sensor unit (18) receives a pause signal and activates the pause control circuit (31). The pause control circuit (31) controls the REC/REP select unit (30) so as to generate a control signal at the output terminal (n) of the latter. This enables the signal repeating circuit (23) to output repeatedly to the RF modulator (24) the audio frequency signal which has been recorded therein. The RF modulator (24) converts the received audio frequency signal into a corresponding radio frequency signal. Upon reception of the pause signal, the pause control circuit (31) controls the first relay switch (25) so as to connect electrically the switch terminals (d, e), thereby permitting the mixer (26) to receive the output of the RF modulator (24). When the video tape recorder is in a pause state, a static video signal and no audio signal is received at the RF-IN terminal (11). The mixer (26) provides a static video signal and a repeating audio signal to the RF-OUT terminal (12) for reception by the television set at the antenna input of the latter. Thus, the television set generates a static picture and a repeating sound output as long as the pause control circuit (31) remains activated.

2. FIG. 3 is an equivalent schematic circuit block diagram of the preferred embodiment when used with a television set which has an audio input terminal. The RF-IN terminal (11) is connected to the RF-OUT terminal of the video tape recorder. The RF-OUT terminal (12) is connected to the RF-IN terminal, such as the antenna input, of the television set. The AUDIO-OUT NO. 1 terminal (14) is connected to the AUDIO-IN terminal of the television set. The third slide button (8) is placed in the fifth position (9), thereby causing the connection of the switch terminals (a, b) of the signal select switch (21). The radio frequency signal from the video tape recorder, which is provided to the RF-IN terminal (11), has a first portion, which is sent to the RF-OUT terminal (12) so as to provide video and audio signals to the television set, and a second portion, which is received by the demodulator (20) for conversion into an audio frequency signal. The output of the demodulator (20) is received by the signal repeating circuit (23) via the switch terminals (a, b) of the signal select switch (21). The REC/REP select unit (30) normally generates a control signal at the output terminal (m), thereby enabling the signal repeating circuit (23) to record approximately 20 seconds of the audio frequency signal from the signal select switch (21) while overwriting the previously recorded audio frequency signal. When the pause key of the remote control unit of the video tape recorder is pressed, the sensor unit (18) receives a pause signal and activates the pause control circuit (31). The pause control circuit (31) controls the REC/REP select unit (30) so as to generate a control signal at the output terminal (n) and further controls the second relay switch (27) so as to connect electrically the switch terminals (f, g). The signal repeating circuit (23) provides a repeating audio frequency output to the AUDIO-OUT NO. 1 terminal (14) via the third relay switch (27) at this stage. When the video tape recorder is in a pause state, a static video signal and no audio signal is sent to the RF-IN terminal (11) for reception by the television set via the RF-OUT terminal (12). Thus, the television set generates a static picture and a repeating sound output as long as the pause control circuit (31) remains activated.

Figure 4:
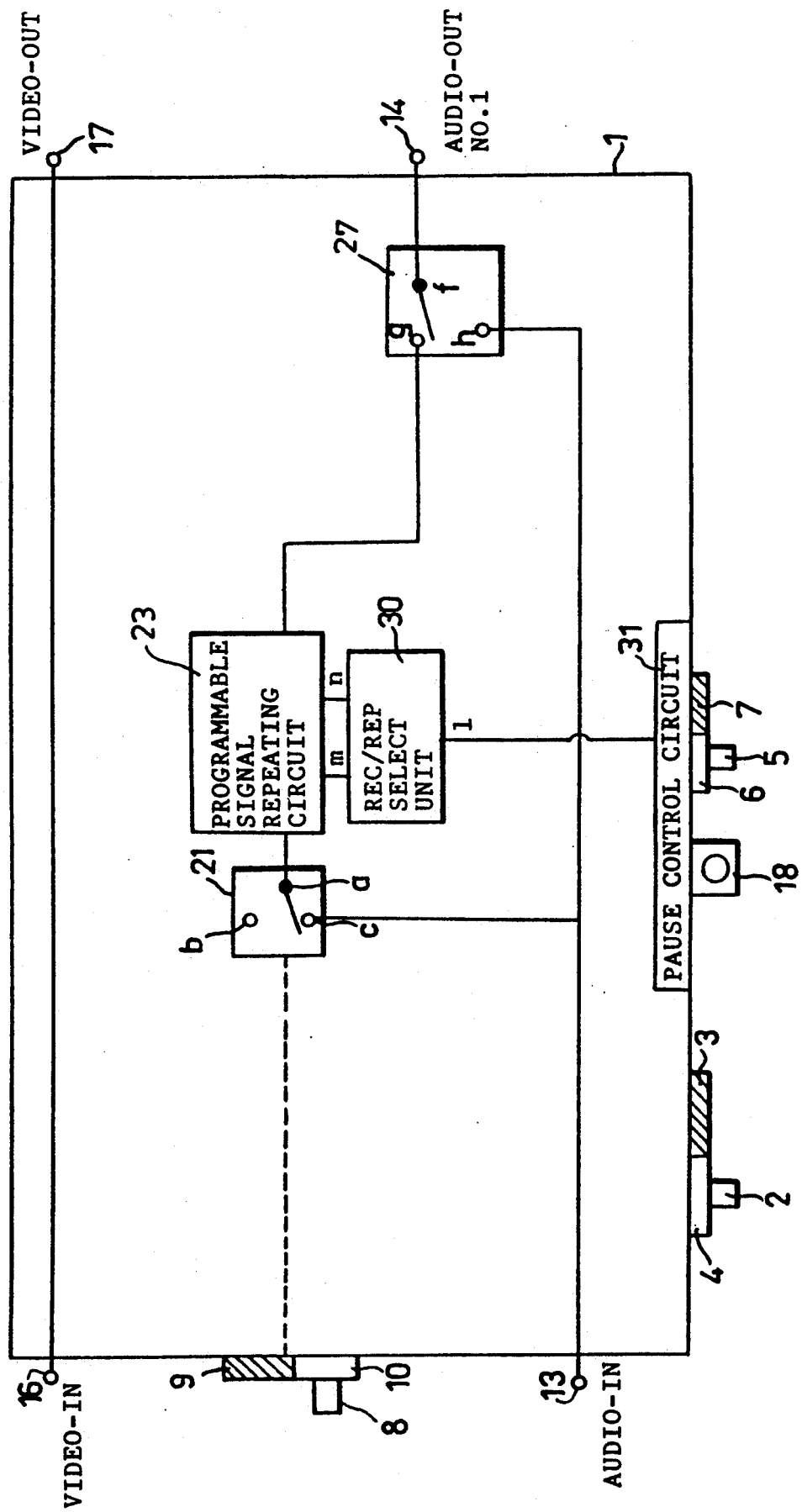
FIG. 4 is an equivalent schematic circuit block diagram of the preferred embodiment when in a third preferred operating state.

3. FIG. 4 is an equivalent schematic circuit block diagram of the preferred embodiment when used with a television set which has audio/video input terminals. The AUDIO-IN terminal (13) is connected to the AUDIO-OUT terminal of the video tape recorder. The AUDIO-OUT NO. 1 terminal (14) is connected to the AUDIO-IN terminal of the television set. The VIDEO-IN terminal (16) is connected to the VIDEO-OUT terminal of the video tape recorder. The VIDEO-OUT terminal (17) is connected to the VIDEO-IN terminal of the television set. Picture signals from the video tape recorder are therefore provided directly to the television set. The third slide button (8) is placed in the sixth position (10), thereby causing the connection of the switch terminals (a, c) of the signal select switch (21). The audio frequency signal from the video tape recorder, which is provided to the AUDIO-IN terminal (13), has a first portion, which is received by the signal repeating circuit (23) via the switch terminals (a, c) of the signal select switch (21), and a second portion, which is provided to the AUDIO-OUT NO. 1 terminal (14) via the switch terminals (f, h) of the second relay switch (27), thereby permitting the transmission of audio signals to the television set. The REC/REP select unit (30) normally generates a control signal at the output terminal (m), thereby enabling the signal repeating circuit (23) to record approximately 20 seconds of the audio frequency signal from the signal select switch (21) while overwriting the previously recorded audio frequency signal. When the pause key of the remote control unit of the video tape recorder is pressed, the sensor unit (18) receives a pause signal and activates the pause control circuit (31). The pause control circuit (31) controls the REC/REP select unit (30) so as to provide a control signal at the output terminal (n) and further controls the second relay switch (27) so as to connect electrically the switch terminals (f, g). No audio signal is present at the AUDIO-IN terminal (13), and the video tape recorder provides a static picture signal to the VIDEO-IN terminal (16) at this stage. The signal repeating circuit (23) provides a repeating audio frequency output to the AUDIO-OUT NO. 1 terminal (14) via the switch terminals (f, g) of the second relay switch (27). Thus, the television set generates a static picture and a repeating sound output as long as the pause control circuit (31) remains activated.

Figure 5:
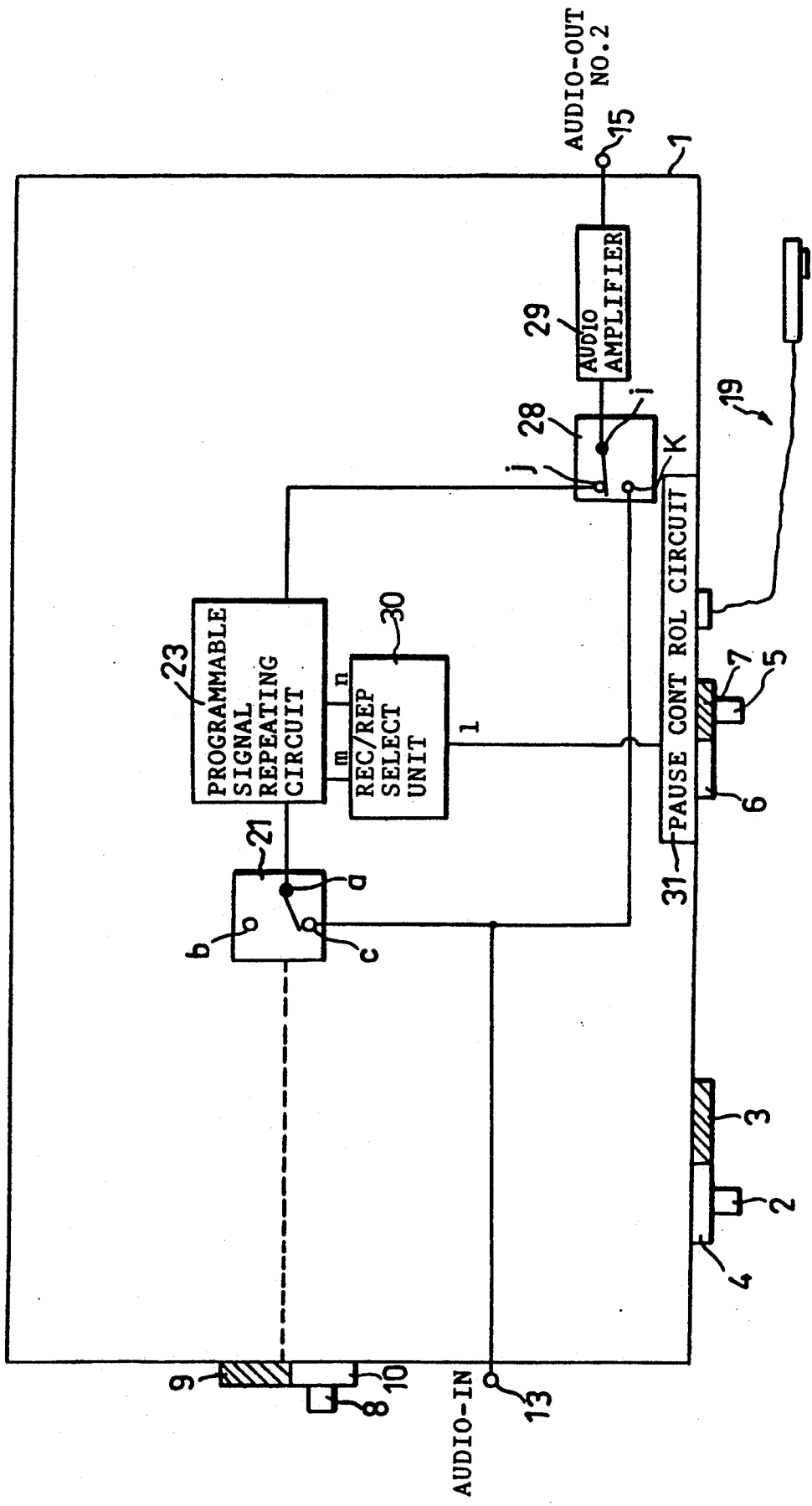
FIG. 5 is an equivalent schematic circuit block diagram of the preferred embodiment when in a fourth preferred operating state.

B. Referring to FIG. 5, if the preferred embodiment is to be used with an audio input equipment, such as a cassette tape recorder, the second slide button (5) is initially placed in the fourth position (7), thereby permitting line control operation of the preferred embodiment. The third slide button (8) is placed in the sixth position (10), thereby causing the electrical connection of the switch terminals (a, c) of the signal select switch (21). The AUDIO-IN terminal (13) receives an external audio frequency signal from the audio input equipment. The AUDIO-OUT NO. 2 terminal (15) is to be connected to a loudspeaker. The REC/REP select unit (30) normally provides a control signal at the output terminal (m), and the switch terminals (i, k) of the third relay switch (28) are normally electrically connected. The external audio frequency signal, which is provided to the AUDIO-IN terminal (13), has a first portion, which passes through the switch terminals (i, k) of the third relay switch (28) and the audio amplifier (29) for reception at the AUDIO-OUT NO. 2 terminal (15), and a second portion, which is received by the signal repeating circuit (23) via the switch terminals (a, c) of the signal select switch (21). The control signal at the output terminal (m) enables the signal repeating circuit (23) to record approximately 20 seconds of the audio frequency signal from the signal select switch (21) while overwriting the previously recorded audio frequency signal. When the pause key of the line control unit (19) is pressed, the pause control circuit (31) is activated. The pause control circuit (31) controls the REC/REP select unit (30) so as to provide a control signal at the output terminal (n) and further controls the third relay switch (28) so as to connect electrically the switch terminals (i, j). The signal repeating circuit (23) is therefore enabled so as to output repeatedly to the audio amplifier (29) the audio frequency signal which has been recorded therein via the switch terminals (i, j) of the third relay switch (28). The loudspeaker (not shown), which is connected to the AUDIO-OUT NO. 2 terminal (15), generates a repeating sound output as long as the pause control circuit (31) remains activated.

Figure 6:
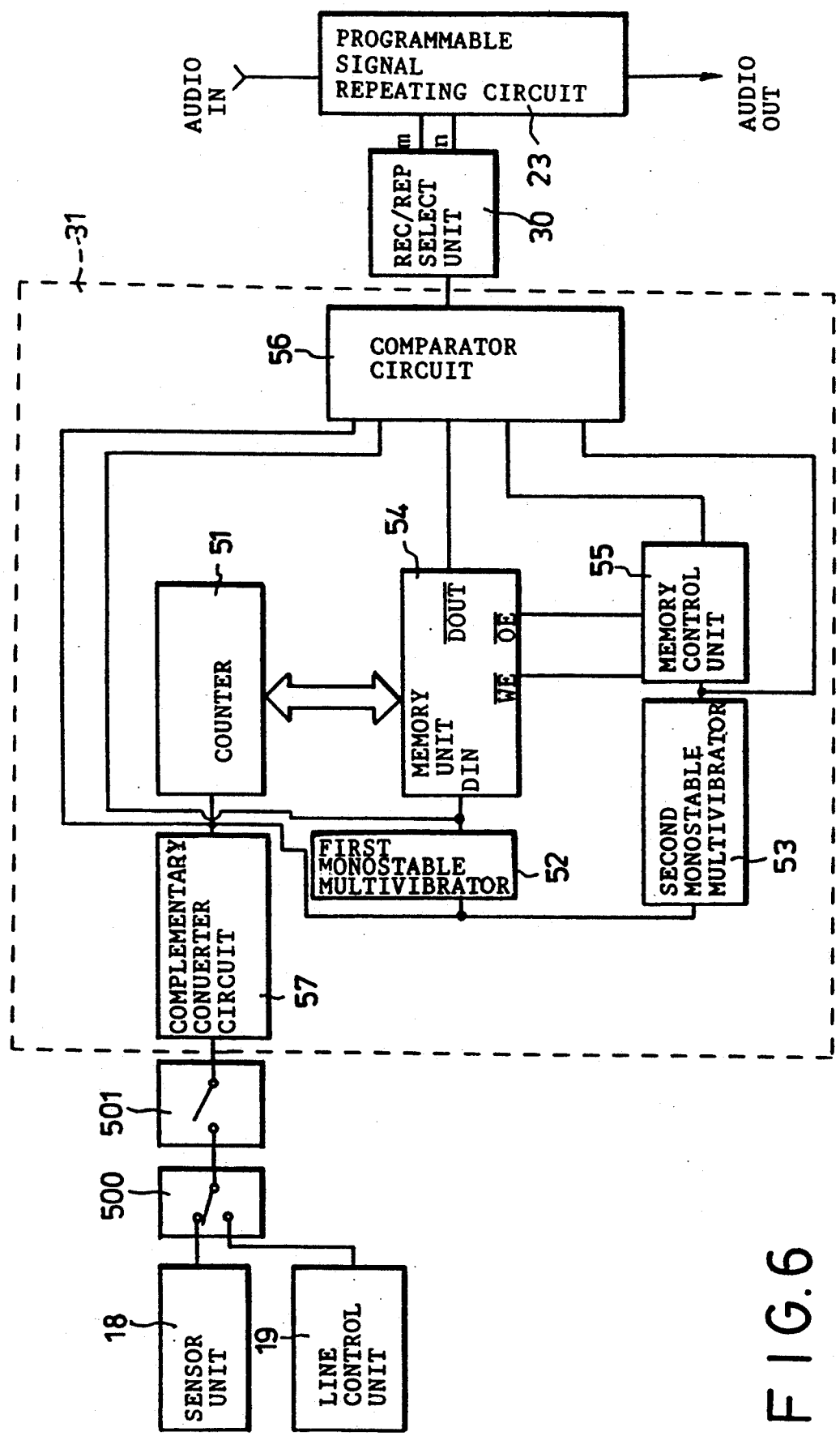
FIG. 6 is a schematic circuit block diagram of a pause control circuit of the preferred embodiment.

FIG. 6 is a schematic circuit block diagram of the pause control circuit (31). A switch unit (500) is controlled by the second slide button (5) so as to select which one of the sensor unit (18) and the line control unit (19) is to be connected to the pause control circuit (31). A switch unit (501) is controlled by the first slide button (2) so as to connect the selected one of the sensor unit (18) and the line control unit (19) to the pause control circuit (31). The pause control circuit (31) is further connected to the REC/REP select unit (30) and comprises a counter (51), a first monostable multivibrator (52), a second monostable multivibrator (53), a memory unit (54), a memory control circuit (55) and a comparator circuit (56). The counter (51), the first and second multivibrators (52, 53) and the comparator unit (56) receive a coded signal from the selected one of the sensor unit (18) and the line control unit (19). Since the coded signal may be a positive logic signal or a negative logic signal, a complementary converter circuit (57) is provided to process coded signals from the sensor unit (18) and the line control unit (19) prior to further processing by the pause control circuit (31). The complementary converter circuit (57) permits the passage of a positive logic signal therethrough and converts a negative logic signal into a corresponding positive logic signal before passing the same therethrough.

Figure 7:
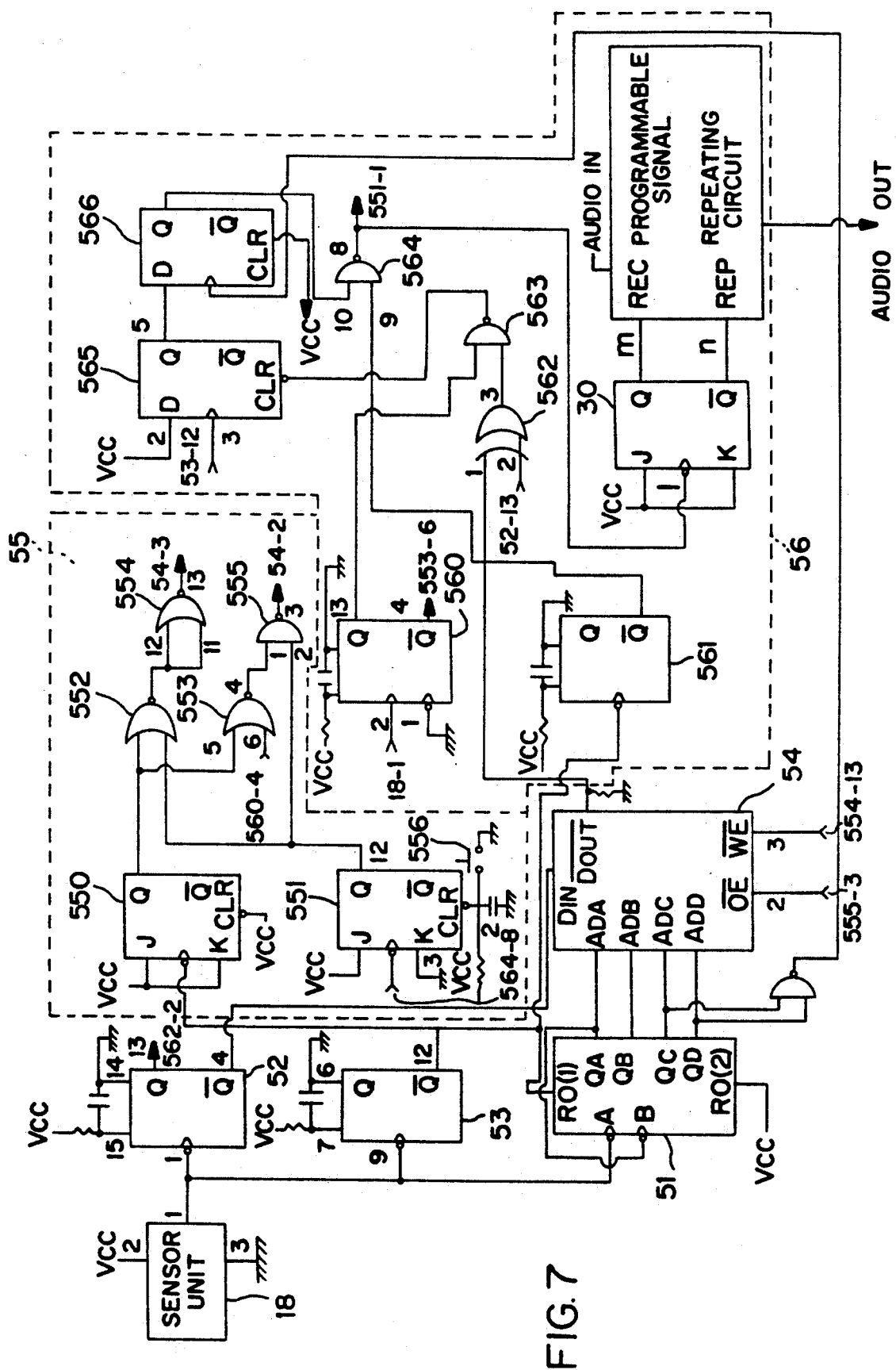
FIG. 7 is a schematic electrical circuit diagram of the pause control circuit shown in FIG. 6.

FIG. 7 is a schematic electrical circuit diagram of the pause control circuit (31). It is assumed that only the sensor unit (18) is in use and that the sensor unit (18) provides a positive logic signal, thereby obviating the need for the complementary converter circuit (57). The first and second monostable multivibrators (52, 53) are preferably retriggerable one-shot multivibrators with clear and complementary outputs (DM54LS123/DM74LS123). The memory control circuit (55) includes a first flip-flop (550), a second flip-flop (551), a first NOR gate (552), a second NOR gate (553), a third NOR gate (554) and a first NAND gate (555). The comparator circuit (56) includes a third monostable multivibrator (560), a fourth monostable multivibrator (561), an XOR gate (562), a second NAND gate (563), a third NAND gate (564), a third flip-flop (565) and a fourth flip-flop (566). The third and fourth monostable multivibrators (560, 561) are similar to the first and second monostable multivibrators (52, 53) and are preferably retriggerable one-shot multivibrators with clear and complementary outputs (DM54LS123/DM74LS123).

Figure 8A:
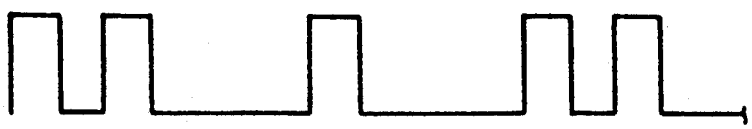
FIGS. 8A to 8G illustrate the signal waveforms obtained at different nodes of the pause control circuit shown in FIG. 7.
Figure 8B:
Figure 8C:
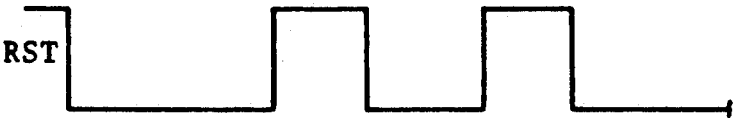
Figure 8D:

The input terminal of the counter (51) receives a coded pulse signal (Refer to FIG. 8A) from the sensor unit (18) when the pause key of the remote control unit is pressed. The counter (51) generates a corresponding address signal (QA-QD) to the memory unit (54) at this stage. A first RC circuit is connected to the first monostable multivibrator (52). The time constant of the first RC circuit is used to control the processing of the coded pulse signal shown in FIG. 8A. The signal waveforms at the (Q) and (/Q) outputs of the first multivibrator (52) are respectively shown in FIGS. 8B and 8C. A second RC circuit is connected to the second monostable multivibrator (53). The time constant of the second RC circuit should correspond to the duration of the coded pulse signal from the sensor unit (18) The signal waveform at the (/Q) output of the second multivibrator (53) is shown in FIGS. 8D. The (/Q) output of the first monostable multivibrator (52) is received by the memory unit (54) at a Din terminal of the latter for storage in a corresponding address which is indicated by the counter (51) during a code setting operation. The (/Q) output of the second monostable multivibrator (53) is received by the first flip-flop (550) of the memory control circuit (55) and by the fourth monostable multivibrator (561) of the comparator circuit (56) and enables the third flip-flop (565) of the comparator circuit (56).

The (/Q) output of the second monostable multivibrator (53) is connected to the (/CLK) input of the first flip-flop (550) of the memory control circuit (55). The first flip-flop (550) further has (J), (K), and (CLR) pins which are connected to an external power source (Vcc). Whenever the first flip-flop (550) receives a clock pulse from the second monostable multivibrator (53), the logic states of the (Q) and (/Q) outputs of the first flip-flop (550) varies. The (Q) output of the first flip-flop (550) is connected to one of the inputs of the first and second NOR gates (552, 553). The second flip-flop (551) has a (J) pin which is connected to the external power source (Vcc) and a (K) pin which is grounded. The (CLR) pin of the second flip-flop (551) is connected to a reset circuit. The reset circuit includes a switch (556) which is operable so as to ground the (CLR) pin, thereby resetting the second flip-flop (551).

The switch (556) is closed when it is desired to store a code in the memory unit (54), thereby generating a low logic signal at the (Q) output of the second flip-flop (551). Upon reception of a coded pulse signal from the sensor unit (18), the second monostable multivibrator (53) generates a clock pulse to the first flip-flop (550), thereby generating a low logic signal at the (Q) output of the latter. The low logic signals at the (Q) outputs of the first and second flip-flops (550, 551) are received by the first NOR gate (552), thereby causing the latter to generate a high logic signal to the third NOR gate (554). The third NOR gate (554) responds by generating a low logic signal to a write enable (/WE) pin of the memory unit (54), thereby enabling the memory unit (54) to store data from the (/Q) output of the first monostable multivibrator (52) at a memory address which is indicated by the counter (51). This illustrates the operation of the preferred embodiment during a code setting operation.

Figure 8E:
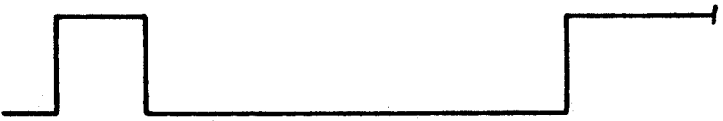

The (Q) output of the second flip-flop (551) reverts to a high logic state when the switch (556) is opened. This causes the output of the first NOR gate (552) to change to a low logic signal, thereby causing the third NOR gate (554) to generate a high logic signal. The writing capability of the memory unit (54) is disabled at this stage. The high logic signal from the second flip-flop (551) is simultaneously received at one of the inputs of the first NAND gate (555). The other input of the first NAND gate (555) is connected to the output pin of the second NOR gate (553). One of the inputs of the second NOR gate (553) is connected to the (/Q) output of the third monostable multivibrator (560). The other input of the second NOR gate (553) is connected to the (Q) output of the first flip-flop (550). When both inputs to the second NOR gate (553) are at a low logic state, the second NOR gate (553) generates a high logic signal to the first NAND gate (555). Since both inputs to the first NAND gate (555) are at a high logic state, the first NAND gate (555) generates a low logic signal to the read enable (/OE) pin of the memory unit (54). The memory unit (54) responds by outputting the data stored therein at a (/Dout) pin of the same. The signal waveform at the (/Dout) pin of the memory unit (54) is shown in FIG. 8E.

Figure 8F:

The third monostable multivibrator (560) has a clock input which receives the coded pulse signal from the sensor unit (18). The third monostable multivibrator (560) is provided with a third RC circuit. The third RC circuit has a time constant which is a small fraction of the time period of one of the coded pulses from the sensor unit (18). The signal waveform at the (Q) output of the third monostable multivibrator (560) is shown in FIG. 8F. The fourth monostable multivibrator (561) has a clock input which is connected to the (/Q) output of the second monostable multivibrator (53). Upon reception of a low logic signal from the second monostable multivibrator (53), the fourth monostable multivibrator (561) generates a high logic signal at the (/Q) output thereof for reception by the third NAND gate (564).

Figure 8G:

The signal at the (/Dout) pin of the memory unit (54) (Refer to FIG. 8E) and the signal at the (Q) output of the first monostable multivibrator (52) (Refer to FIG. 8B) are received by the XOR gate (562). The signal waveform at the output of the XOR gate (562) is shown in FIG. 8G. The signal at the output of the XOR gate (562) and the signal at the (Q) output of the third monostable multivibrator (560) (Refer to FIG. 8F) are received by the second NAND gate (563).

If the coded pulse signal from the sensor unit (18) does not tally with the coded data stored in the memory unit (54), the second NAND gate (563) will generate a low logic signal to the (CLR) pin of the third flip-flop (565). The (Q) output of the third flip-flop (565) generates a low logic signal to the (D) input of the fourth flip-flop (566). The fourth flip-flop (566) responds by generating a low logic signal at the (Q) output of the same for reception by the third NAND gate (564). The third NAND gate (564) then generates a high logic signal to the REC/REP select unit (30). In the preferred embodiment, the REC/REP select unit (30) is a J-K flip-flop which has (J) and (K) pins connected to the external power source (Vcc). The clock input of the REC/REP select unit (30) is connected to the output of the third NAND gate (564). Upon reception of a high logic signal from the third NAND gate (564), the logic states at the (Q) and (/Q) outputs of the REC/REP select unit (30) do not vary, thereby maintaining the signal repeating circuit (23) in the recording mode.

If the coded pulse signal from the sensor unit (18) tallies with the coded data stored in the memory unit (54), the second NAND gate (563) will generate a high logic signal to the (CLR) pin of the third flip-flop (565). The (Q) output of the third flip-flop (565) generates a high logic signal to the (D) input of the fourth flip-flop (566). The fourth flip-flop (566) responds by generating a high logic signal at the (Q) output of the same for reception by the third NAND gate (564). Since the (/Q) output of the fourth monostable multivibrator (561) is at a high logic state at this stage, the third NAND gate (564) generates a low logic signal to the REC/REP select unit (30). The logic states at the (Q) and (/Q) outputs of the REC/REP select unit (30) vary, thereby enabling the signal repeating circuit (23) to operate in the reproducing mode.

The output of the third NAND gate (564) is also connected to the clock input of the second flip-flop (551). The third NAND gate (564) normally controls the second flip-flop (551) so as to maintain the (Q) output of the latter at a high logic state, thereby disabling the writing capabilities of the memory unit (54).

Note that the preferred embodiment is adapted for use with different types of remote control units. The pause control circuit (31) is initially set so as to store the code which corresponds to a pause key of the remote control unit. The code setting operation is again executed if a different remote control unit is to be used.

The pause control circuit (31) may be provided with an internal power source (not shown) so as to prevent loss of data in the memory unit (54) when the external power source is interrupted. This obviates the need for frequent execution of the code setting operation.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A sound repeater unit adapted for use with an audio-visual input equipment having a radio frequency output and a television set having a radio frequency input, said audio-visual input equipment further having a control unit with a pause key which is actuated so as to operate the audio-visual input equipment in a paused state, said sound repeater unit comprising:
a radio frequency demodulator means adapted to receive the radio frequency output of the audio-visual input equipment, said demodulator means converting the radio frequency output of the audio-visual input equipment into a corresponding audio frequency signal;
a pause control circuit means adapted to receive an activating signal from the control unit, said pause control circuit means generating a first control signal when the audio-visual input equipment is in a normal operating state and further generating a second control signal when the pause key is actuated so as to operate the audio-visual input equipment in the paused state;
a programmable signal repeating circuit means connected to said demodulator means and said pause control circuit means, said signal repeating circuit means being enabled by the first control signal so as to record continuously the audio frequency signal from said demodulator means while overwriting a previously recorded audio frequency signal, said signal repeating circuit means being enabled by the second control signal so as to output repeatedly a portion of the audio frequency signal, which portion was recorded within a predetermined time period immediately before the pause key was actuated in order to operate the audio-visual input equipment in the paused state;

a radio frequency modulator means connected to and receiving the output of said signal repeating circuit means, said modulator means converting the output of said signal repeating circuit means into a corresponding radio frequency signal;

a mixer means having a first input which is adapted to receive the radio frequency output of the audio-visual input equipment, a second input and an output which is adapted to be connected to the radio frequency input of the television set, said mixer means including a switch means which is controlled by said pause control circuit means so as to disconnect said second input and said modulator means to permit direct transmission of the radio frequency output of the audio-visual input equipment to the television set when the audio-visual input equipment is in the normal operating state and so as to connect said second input and said modulator means in order to enable said mixer means to mix and send the radio frequency output of the audio-visual input equipment and the radio frequency signal from said modulator means to the television set when the pause key is actuated so as to operate the audio-visual input equipment in the paused state;

whereby, the television set has a static picture image and a repeating sound output when the audiovisual input equipment is in the paused state.

2. The sound repeater unit as claimed in claim 1, further comprising:

a memory means for storing a predetermined code therein; and a comparator means connected to said memory means and adapted to receive the activating signal from the control unit of the audio-visual input equipment, said comparator means comparing the activating signal with said predetermined code in said memory means, said comparator means generating the first control signal when the activating signal does not tally with said predetermined code, said comparator means generating the second control signal when the activating signal tallies with said predetermined code.

3. A sound repeater unit adapted for use with an audio-visual input equipment having a radio frequency output and a television set having a radio frequency input and an audio frequency input, said audio-visual input equipment further having a control unit with a pause key which is actuated so as to operate the audio-visual input equipment in a paused state, said sound repeater unit comprising:

a radio frequency input terminal adapted to receive the radio frequency output of the audio-visual input equipment;

a radio frequency output terminal connected to said radio frequency input terminal and adapted to be connected to the radio frequency input of the television set;

a radio frequency demodulator means connected to the radio frequency input terminal and receiving the radio frequency output of the audio-visual input equipment therefrom, said demodulator means converting the radio frequency signal output of the audio-visual input equipment into a corresponding audio frequency signal;

a pause control circuit means adapted to receive an activating signal from the control unit, said pause control circuit means generating a first control signal when the audio-visual input equipment is in a normal operating state and further generating a second control signal when the pause key is actuated so as to operate the audio-visual input equipment in the paused state;

a programmable signal repeating circuit means connected to said demodulator means and to said pause control circuit means, said signal repeating circuit means being enabled by the first control signal so as to record continuously the audio frequency signal from said demodulator means while overwriting a previously recorded audio frequency signal, said signal repeating circuit means being enabled by the second control signal so as to output repeatedly a portion of the audio frequency signal, which portion was recorded within a predetermined time period immediately before the pause key was actuated in order to operate the audio-visual input equipment in the paused state;

an audio frequency output terminal adapted to be connected to the audio frequency input of the television set; and a switch means which is controlled by said pause control circuit means so as to disconnect said signal repeating circuit means and said audio frequency output terminal when the audio-visual input equipment is in the normal operating state and so as to connect said signal repeating circuit means and said audio frequency output terminal in order to send the output of said signal repeating circuit means to the television set when the pause key is actuated so as to operate the audio-visual input equipment in the paused state;

whereby, the television set has a static picture image and a repeating sound output when the audio-visual input equipment is in the paused state.

4. The sound repeater unit as claimed in claim 3, further comprising:

a memory means for storing a predetermined code therein; and a comparator means connected to said memory means and adapted to receive the activating signal from the control unit of the audio-visual input equipment, said comparator means comparing the activating signal with said predetermined code in said memory means, said comparator means generating the first control signal when the activating signal does not tally with said predetermined code, said comparator means generating the second control signal when the activating signal tallies with said predetermined code.

5. A sound repeater unit adapted for use with an audio-visual input equipment having a video output and an audio frequency output and a television set having a video input and an audio frequency input, said audio-visual input equipment further having a control unit with a pause key which is actuated so as to operate the audio-visual input equipment in a paused state, said sound repeater unit comprising:

a video input terminal adapted to receive the video output of the audio-visual input equipment;

a video output terminal connected to said video input terminal and adapted to be connected to the video input of the television set;

an audio frequency input terminal to receiver the audio frequency output of the audio-visual input equipment;

a pause control circuit means adapted to receive an activating signal from the control unit, said pause control circuit means generating a first control signal when the audio-visual input equipment is in a normal operating state and further generating a second control signal when the pause key is actuated so as to operate the audio-visual input equipment in the paused state;

a programmable signal repeating circuit means connected to said audio frequency input terminal and said pause control circuit means, said signal repeating circuit means being enabled by the first control signal so as to record continuously the audio frequency output of the audio-visual input equipment from said audio frequency input terminal while overwriting a previously recorded said audio frequency output of the audio-visual input equipment, said signal repeating circuit means being enabled by the second control signal so as to output repeatedly a portion of said audio frequency output of said audio-visual input equipment, which portion was recorded within a predetermined time period immediately before the pause key was actuated in order to operate the audio-visual input equipment in the paused state;

an audio frequency output terminal adapted to be connected to the audio frequency input of the television set; and a switch means which is controlled by said pause control circuit means so as to connect said audio frequency input terminal and said audio frequency output terminal when the audio-visual input equipment is in the normal operating state and so as to connect said signal repeating circuit means and said audio frequency output terminal in order to send the output of the signal repeating circuit means to the television set when the pause key is actuated so as to operate the audio-visual input equipment in the paused state;

whereby, the television set has a static picture image and a repeating sound output when the audio-visual input equipment is in the paused state.

6. The sound repeater unit as claimed in claim 5, further comprising:

a memory means for storing a predetermined code therein; an a comparator means connected to said memory means and adapted to receive the activating signal from the control unit of the audio-visual input equipment, said comparator means comparing the activating signal with said predetermined code in said memory means, said comparator means generating the first control signal when the activating signal does not tally with said predetermined code, said comparator means generating the second control signal when the activating signal tallies with said predetermined code.

7. A sound repeater unit adapted for use with an audio output equipment and an audio input equipment having an audio frequency output and a control unit with a pause key which is actuated so as to operate the audio input equipment in a paused state, said sound repeater unit comprising:

an input terminal adapted to receive the audio frequency output of the audio input equipment;

a pause control circuit means adapted to receive an activating signal from the control unit, said pause control circuit means generating a first control signal when the audio input equipment is in a normal operating state and further generating a second control signal when the pause key is actuated so as to operate the audio input equipment in the paused state;

a programmable signal repeating circuit means connected to said input terminal and to said pause control circuit means, said signal repeating circuit means being enabled by the first control signal so as to record continuously the audio frequency output of the audio input equipment from said input terminal while overwriting a previously recorded audio frequency output of the audio input equipment, said signal repeating circuit means being enabled by the second control signal so as to output repeatedly a portion of the audio frequency output of the audio input equipment, which portion was recorded within a predetermined time period immediately before the pause key was actuated in order to operate the audio input equipment in the paused state;

an output terminal adapted to be connected to the audio output equipment; and a switch means which is controlled by said pause control circuit means so as to connect said input terminal and said output terminal when the audio input equipment is in the normal operating state and so as to connect said signal repeating circuit means and said output terminal in order to send the output of the signal repeating circuit means to the audio output equipment when the pause key is actuated so as to operate the audio input equipment in the paused state;

whereby, the audio output equipment has a repeating sound output when the audio input equipment is in the paused state.

8. The sound repeater unit as claimed in claim 7, further comprising:

a memory means for storing a predetermined code therein; and a comparator means connected to said memory means and adapted to receive the activating signal from the control unit of the audio input equipment, said comparator means comparing the activating signal with said predetermined code in said memory means, said comparator means generating the first control signal when the activating signal does not tally with said predetermined code, said comparator means generating the second control signal when the activating signal tallies with said predetermined code.

9. The sound repeater unit as claimed in claim 7, further comprising an audio amplifier means interconnecting said switch means and said output terminal, said audio amplifier means amplifying audio frequency signals to the audio output equipment.

* * * * *